United States Patent
Pierre

[11] 3,963,469
[45] June 15, 1976

[54] GLASS SHEET ANNEALING LEHR

[75] Inventor: Andre Paul Pierre, Cambronne-les-Ribecourt, France

[73] Assignee: Saint-Gobain Industries, France

[22] Filed: Nov. 18, 1974

[21] Appl. No.: 525,023

[52] U.S. Cl. .................................. 65/194; 65/350; 65/351
[51] Int. Cl.² .................. C03B 18/02; C03B 25/04
[58] Field of Search ........... 65/117, 118, 119, 99 A, 65/182 R, 348, 349, 350, 351, 194

[56] References Cited
UNITED STATES PATENTS

| | | | |
|---|---|---|---|
| 1,767,913 | 6/1930 | Boudin | 65/253 |
| 2,140,282 | 12/1938 | Drake | 65/349 |
| 3,103,346 | 9/1963 | Buckholdt et al. | 263/6 |
| 3,672,861 | 6/1972 | Ritter, Jr. et al. | 65/350 |
| 3,775,087 | 11/1973 | Ritter, Jr. | 65/348 |

FOREIGN PATENTS OR APPLICATIONS

| | | |
|---|---|---|
| 554,022 | 2/1923 | France |
| 645,995 | 7/1928 | France ........................ 65/253 |

*Primary Examiner*—Arthur D. Kellogg
*Attorney, Agent, or Firm*—Pennie & Edmonds

[57] ABSTRACT

A leer for the cooling and annealing of glass includes, at the entering, hot end thereof, a plurality of smooth-surfaced glass-supporting rollers of stainless steel and, at the cool or exit end a plurality of glass-supporting rollers of stainless steel having circumferential or helical ridges on which the glass rests.

7 Claims, 4 Drawing Figures

GLASS SHEET ANNEALING LEHR

The present invention pertains to ovens or furnaces, sometimes called leers or lehrs, used for cooling and annealing glass sheet produced by the float process, in which a continuous sheet or ribbon of glass is obtained at the outlet end of a chamber containing a bath of molten metal on which the glass floats and spreads into a thin sheet. From this chamber the glass passes into a leer in which it is supported on rollers and is gradually cooled as it passes through the leer. These rollers must preserve undamaged the surface of the glass at which the glass rests on them.

Leers for cooling glass may be considered to include a high temperature part and a low temperature part. In the high temperature part, the time rate of temperature drop of the glass is held at low values in order to effect dissipation of stresses in the glass. In the low temperature part the glass, now entirely solidified, is more rapidly reduced in temperature. Thus in a leer of 120 meters length or thereabouts, wherein the glass enters at a temperature of about 600°C. and emerges at a temperature of about 150°C., the decline in glass temperature is very slow down to 450°C. and much faster thereafter.

In the hot part, the glass-supporting rollers are held in their entirety at the temperature existing around them. Heat exchange between the rollers and the walls of the leer occurs primarily by radiation and the result is a homogeneous temperature of the rollers, which do not undergo change of shape.

In the cooler part, exchange of heat between the rollers and the leer walls occurs by convection in amounts increasing progressively toward the cold end of the leer. The rollers do not cool uniformly by convection, probably because they are carrying a ribbon of glass which screens off air currents from them. The result is inequalities in temperature in the rollers which produce changes in the shape thereof and finally the generatrices, the portion of which are brought to the highest average temperatures becomes convex, that results in a bending of the rollers. This phenomenon is accentuated by the fact that it is always those same portions of the roller which, on successive turns of the roller, come in contact with the glass. The resulting inequalities in temperature in the rollers may result in fracture of the glass ribbon being passed through the leer.

Leers have been previously proposed for handling a continuous glass ribbon in which the rollers in the high temperature part of the leer have smooth surfaces of refractory steel and in which the rollers in the cooler part of the leer have an asbestos coating. The use of smooth, hard-surfaced rollers in the cooler part of the leer is however subject to the disadvantage hereinabove described, and the use there of rollers coated with asbestos likewise has disadvantages. These rollers deteriorate rapidly and, in the event of breakage of the ribbon carried thereby, there may become embedded therein glass fragments which thereafter scratch the surface of the ribbon.

It is an object of the invention to provide an improved leer or glass annealing oven free of these shortcomings. In the leer of the invention, in the first or hotter portion thereof where the rate of temperature drop is slow, there are employed smooth surfaced rollers of stainless steel whereas in the second or cooler part of the leer where the rate of the temperature drop is higher, there are provided rollers of stainless steel which have a shape such that the glass ribbon rests exclusively on separate, spaced parts of the roller surface of greatest radius. With such rollers in the second part of the leer, by reason of the facility with which convection currents of the gases within the leer flow about the rollers and thereby cool them effectively, those rollers do not warp or otherwise change their shape.

According to another feature of the invention, in order to facilitate the circulation of convection currents, the rollers in the second part of the leer are given a smaller diameter than the rollers in the first part, the rollers in the second part having a diameter preferably below 305 millimeters for rolls of 4-meter length spaced about 0.6 meter apart.

The utilization of rollers of small diameter and having ridges thereon promotes the formation of convection currents at the undersurface of the glass ribbon, and hence cooling of the ribbon through heat exchange with it. It also fosters uniformity of temperature around the periphery of the rollers by allowing the heat to penetrate by conductivity from the glass into the rollers only in the zones of the successive bearing parts and by making conductive heat exchange, inside the material of the rollers easier in the radial or peripheral directions than in the axial one.

According to one preferred embodiment of the invention, the rollers in the second part of the leer are provided with annular grooves, the ridges between them being staggered crosswise of the direction of ribbon flow from one roll to the next. This staggering insures a more homogeneous distribution, crosswise of the width of the ribbon, of the heat losses due to conduction between the glass ribbon and the rolls.

According to another embodiment of the invention, the rollers in the second part of the leer are provided with one or more helical ridges. In order to obtain a desirable homogenization in temperature of the zones of reduced diameter on the rollers in the second part of the leer, it is advantageous to provide inside those rollers a granular material or a fluid whose motion with rotation of the rollers augments the heat exchange inside those rollers.

BRIEF DESCRIPTION OF THE DRAWINGS

The invention will now be further described in terms of a presently preferred embodiment and with reference to the accompanying drawings wherein.

DESCRIPTION OF PREFERRED EMBODIMENT

Figure 1:
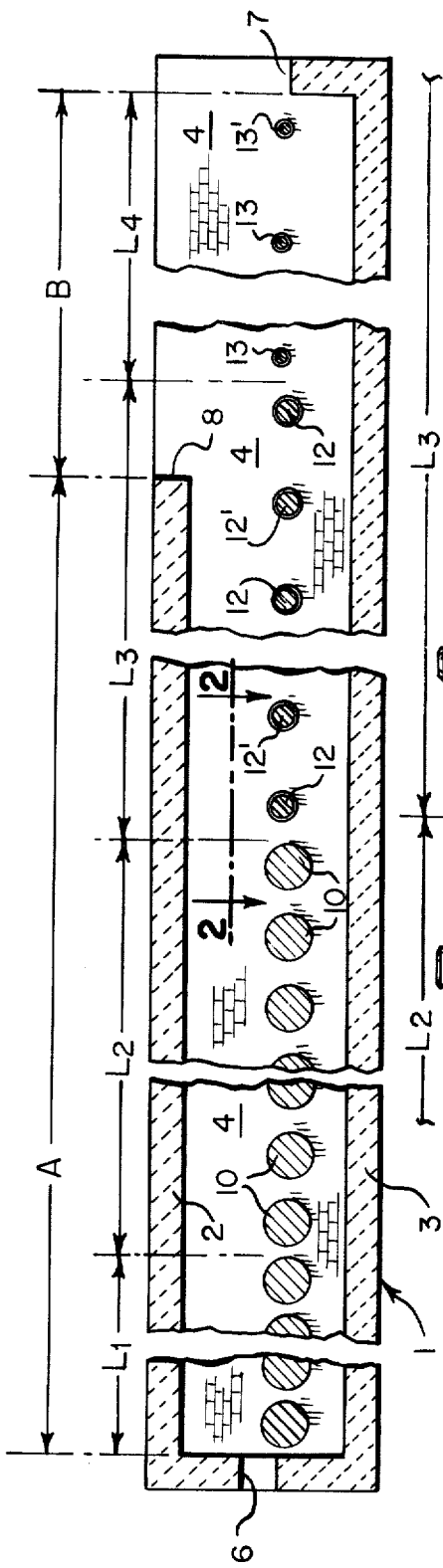
FIG. 1 is a longitudinal vertical section through a leer according to the invention.

The leer of FIG. 1 includes a structure 1 of refractory material essentially tubular in shape, although rectangular in cross-section perpendicular to the plane of the figure. This structure has top and bottom walls 2 and 3 and side walls 4 and 5 of which only one, identified at 4, is seen in the sectional view of FIG. 1. The leer has an entrance aperture 6 at the left and an exit aperture 7 at the right. The top wall extends from the entrance end part way only toward the exit end, the limit of the top wall being indicated at 8, so that the leer includes covered and uncovered portions whose lengths are indicated by the dimension lines A and B in FIG. 1. For convenience of the drawing, the leer is shown broken in four places along its length from left to right.

Figure 2:
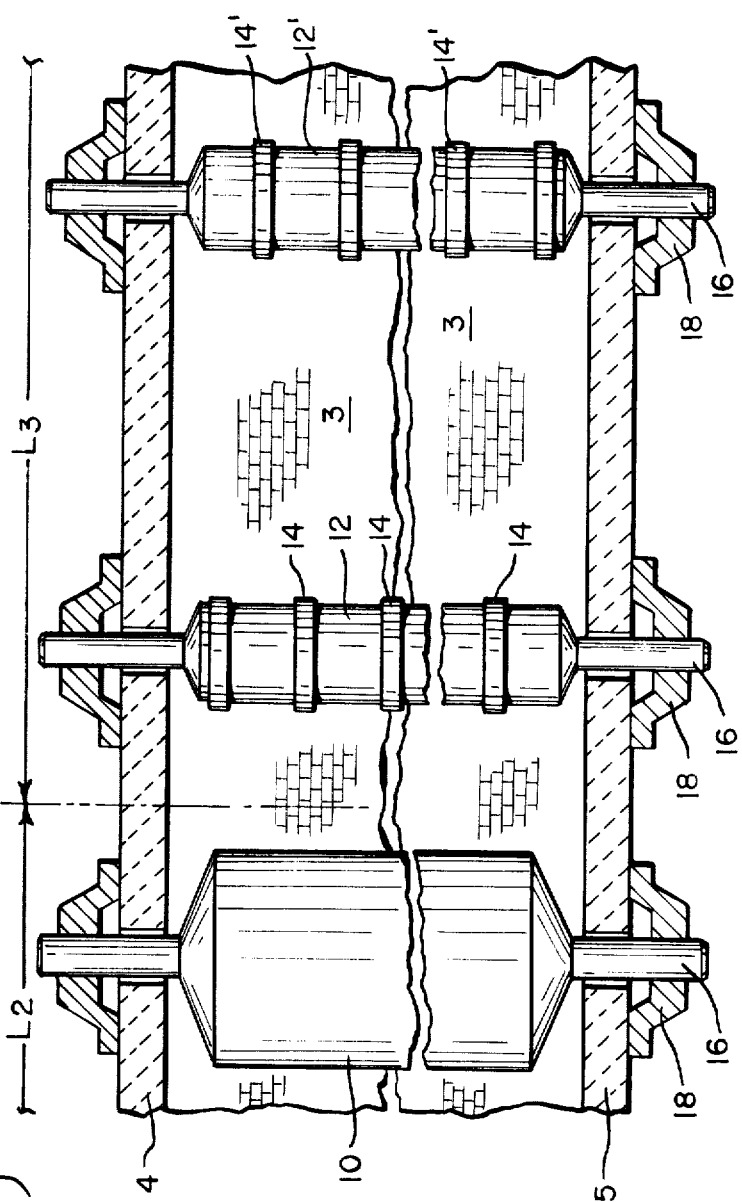
FIG. 2 is a fragmentary plan sectional view of the leer of FIG. 1 taken on the line 2—2 of FIG. 1, shown however at an enlarged scale.
Figure 3:
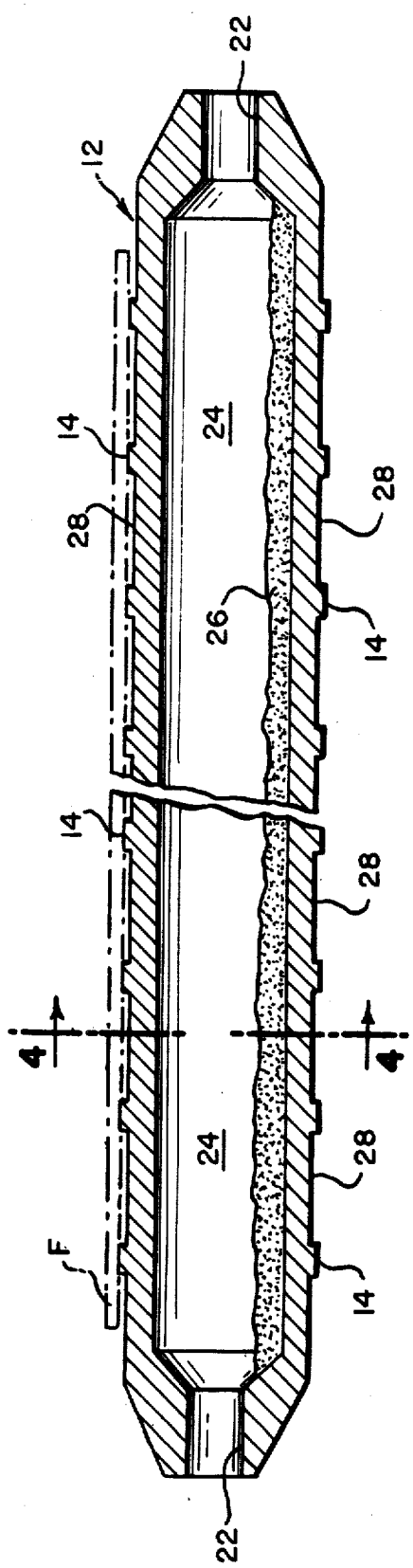
FIG. 3 is an axial section through a roller in a downstream section of the leer of FIG. 1.
Figure 4:
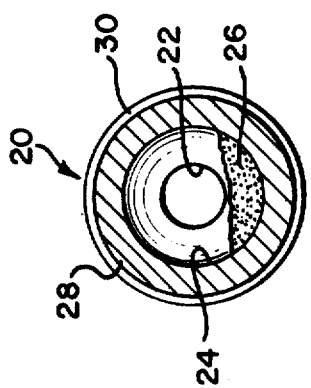
FIG. 4 is a cross-section through the roll of FIG. 3 taken on the line 4—4 of FIG. 3.

The leer of the invention includes at least two sets of rollers. Of these two sets the rollers of the first set, which as between these two sets is adjacent the upstream or hot or entering end of the leer, where the newly formed glass enters, are smooth-surfaced while the rollers of the second set, downstream of the first set and therefore closer to the cooler exit end of the leer, possess a surface made up of a ridge or a plurality of ridges separated by recessed portions, so that the glass rests on the ridge or ridges only. Such a roll is illustrated in FIGS. 3 and 4. Moreover, successive rollers of the second set have their ridges, when they are of annular shape, staggered or off-set with respect to each other crosswise of the direction of motion of the glass and hence lengthwise of the rollers themselves, as shown in FIG. 2. In FIG. 1 the rollers in either or both of the indicated zones $L_1$ and $L_2$ constitute such a first set, and the rollers in either or both of the zones $L_3$ and $L_4$ constitute such a second set. The rollers of the first set are in the first or hotter part of the leer and those of the second set are in the second, cooler part or the leer.

A leer according to the invention is illustrated in FIGS. 1 and 2. It includes four sets of rollers disposed in zones $L_1$, $L_2$, $L_3$ and $L_4$. The rollers 10 in zones $L_1$ and $L_2$ are smooth-surfaced stainless steel rollers, those in zone $L_2$ being of the same dimensions as those in zone $L_1$ but being more widely spaced. The rollers 12 and 12′ in zone $L_3$ and the rollers 13 and 13′ in zone $L_4$ are ridged rollers, those of zone $L_3$ being of smaller outside diameter than those of zones $L_1$ and $L_2$ and those of zone $L_4$ being of smaller outside diameter than those of zone $L_3$. As applied to ridged rollers, the term outside diameter here refers to the diameter on the ridges, as indicated at 14 and 14′ in FIG. 2. Rollers 12′ differ from rollers 12 in having the ridges 14′ of the former offset or staggered, crosswise of the leer and hence lengthwise of the rollers, with respect to the ridges 14 of the latter.

FIGS. 3 and 4 constitute respectively longitudinal axial and transverse sections through one of the rollers 12 used in the zone $L_3$ of the leer of FIGS. 1 and 2. For simplicity of the drawing, it is in only the roller itself which has been shown. The supporting axles and drive mechanism may be of known type. The roller comprises a tube having conical extremities which are provided with openings 22 for receiving supporting shafts or axles. The interior 24 is partially filled with sand as indicated at 26.

On the external surface of the roller, there are annular grooves 28 which are wide, i.e. long in the axial direction of the roll but which are shallow. The result is the formation of annular ridges 14 distributed over the length of the roller. The grooves 28 may be shallow compared to their width, as indicated; a depth of a few millimeters has proven satisfactory. The rollers 13 and 13′ of zone $L_4$ in FIG. 1 may be of the construction shown in FIG. 3, but of smaller diameter than the rollers 12 and 12′.

The result of the construction illustrated in FIG. 3 is that the glass sheet, indicated in cross-section in FIG. 3 at the chain lines F, rests on each roller at a plurality of relatively small areas, each one comprising a fraction of the annular, cylindrical surface of one of the ridges 14. The fraction will depend among other things on the viscosity of the glass and on the speed of its motion. This concentration of support of the glass sheet at limited areas of the rollers limits heat exchange between the glass and the rollers at the grooves 28 of the latter and permits a flow of air between the glass and the rollers at those grooves. Uniformity, axially and circumferentially, in the temperature of each roller in the cooler part of the leer and uniformity in the temperature of the glass sheet crosswise of the leer are promoted by this construction.

A particular design of leer embodying the invention as illustrated in FIGS. 1 and 2 was 120 meters in length, and approximately 5 meters in width. At the entering end, over a zone $L_1$ 10 meters in length, this leer included twenty-five smooth-surfaced rollers 10 of 25/20 chrome nickel steel, 305 millimeters in diameter.

In the adjacent zone $L_2$ which was 50 meters in length there were, in the particular leer being described, one hundred and seven smooth-surfaced rollers 10 of 18/8 chrome nickel steel, 305 millimeters in diameter. The rollers in the zones $L_1$ and $L_2$ were of the same dimensions but were more widely spaced in the zone $L_2$ than in the zone $L_1$.

Under one set of operating conditions of this leer, the temperature dropped from 580°C. at the entrance 6 to 550°C. at the downstream end of the zone $L_1$, and to 450°C. at the downstream end of zone $L_2$.

The leer included a third zone $L_3$ 50 meters in length, of which the first 35 meters were under the top wall 2 and of which the last 15 meters were without a top wall. In this third zone there were, in the design being described, eighty ridged rollers 12 and 12′ as illustrated in FIGS. 3 and 4, made of 18/8 chrome steel and 216 millimeters in outer diameter. These rollers, further illustrated in FIGS. 3 and 4, had ridges 14 or 14′ which were 45 millimeters in length, spaced 227.5 millimeters apart, the diameter of the roller between the ridges being 213 millimeters. Thus the ridges were 1.5 millimeters higher than the reduced diameter portions separating them. Under the particular operating conditions being described, the temperature at the downstream end of the zone $L_3$ had fallen from 450° to 200°C.

In the zone $L_4$ which was 10 meters long, there were 11 ridged rollers 13 of 18/8 chrome nickel steel, 150 millimeters in diameter and having the same dimensions for the ridging and the spacing of the ridges as in the case of the rollers in the zone $L_3$.

FIG. 2 is a fragmentary plan sectional view of the leer of FIG. 1, showing the last, downstream-most roller 10 of zone $L_2$ and the first two rollers 12 and 12′ of zone $L_3$. It will be seen that the roller 10 of zone $L_2$ is smooth-surfaced while the rollers 12 and 12′ of zone $L_3$ bear ridges 14 and 14′ respectively, the ridges 14′ being offset lengthwise of the roll 12′ with respect to the ridges 14 of the roll 12. The rollers of FIG. 2 are shown supported in axles 16 which pass through the side walls of the leer and are supported in bearings 18 outside those side walls. Drive means, which may be conventional and which are not shown, are coupled to the rollers to rotate them with suitably related peripheral speeds so as to minimize slippage between the rollers and the advancing glass sheet, which has not been shown in FIGS. 1 and 2.

While the invention has been described hereinabove in terms of a number of presently preferred embodiments the invention itself is not limited thereto but rather comprehends all modifications of and departures from those embodiments properly falling within the scope of the appended claims.

I claim:

1. In a leer for annealing a continuous sheet or ribbon of float glass, said leer comprising means defining a chamber having an entrance end and an exit end, said chamber being divided into a high temperature portion adjacent the entrance end and a low temperature portion adjacent the exit end, and a plurality of glass supporting rollers in said chamber, the improvement comprising a first plurality of smooth-surfaced glass supporting rollers in said high temperature portion and a second plurality of glass-supporting rollers in said low temperature portion, the rollers of the second plurality having an outside diameter smaller than the rollers of said first plurality and having a surface including metallic-surfaced bearing portions of a common cylindrical surface axially spaced from each other by shallow grooves of a depth sufficient to permit circulation of convection currents between said rollers and glass borne thereon; the outside diameter of said second plurality of rollers being sufficiently smaller than the diameter of said first plurality to permit an increase in the circulation of convection currents about said second plurality of rollers whereby said rollers are more effectively cooled so as to prevent any change in the shape thereof and, in conjunction with said bearing portions, to foster uniformity of temperature around the periphery of the second set of rollers by allowing the heat to penetrate by conductivity from glass supported on said bearing portions into the rollers only in the zones of the bearing portions.

2. A leer according to claim 1 wherein said rollers are of stainless steel.

3. A leer according to claim 1 wherein said portions are of annular shape.

4. A leer according to claim 3 wherein adjacent rollers of said second plurality have said portions axially staggered with respect to each other.

5. The apparatus of claim 1 wherein the grooves have a depth of a few millimeters.

6. The apparatus of claim 1 wherein said first plurality of smooth surfaced glass supporting metallic rollers consists of two sets of rollers both having the same dimensions but the rollers of the set located further from the entrance end of the high temperature portion being more widely spaced apart and said second plurality of glass supporting rollers consists of two sets of rollers with the set of rollers closest to the exit end of the leer having a smaller outside diameter than those of the first set of rollers in said second plurality of glass supporting rollers.

7. The apparatus of claim 6 wherein the first plurality of smooth surfaced glass supporting metallic rollers have an outside diameter of 305 mm., the rollers in the first set of the second plurality of glass supporting rollers have an outside diameter of 216 mm., and the second set of rollers in the second plurality of glass supporting rollers have an outside diameter of 150 mm.

* * * * *